Dec. 27, 1927.  
W. G. RITCHIE  
1,653,662  
MEAT CUTTING MACHINE  
Filed March 28, 1925  
5 Sheets-Sheet 5
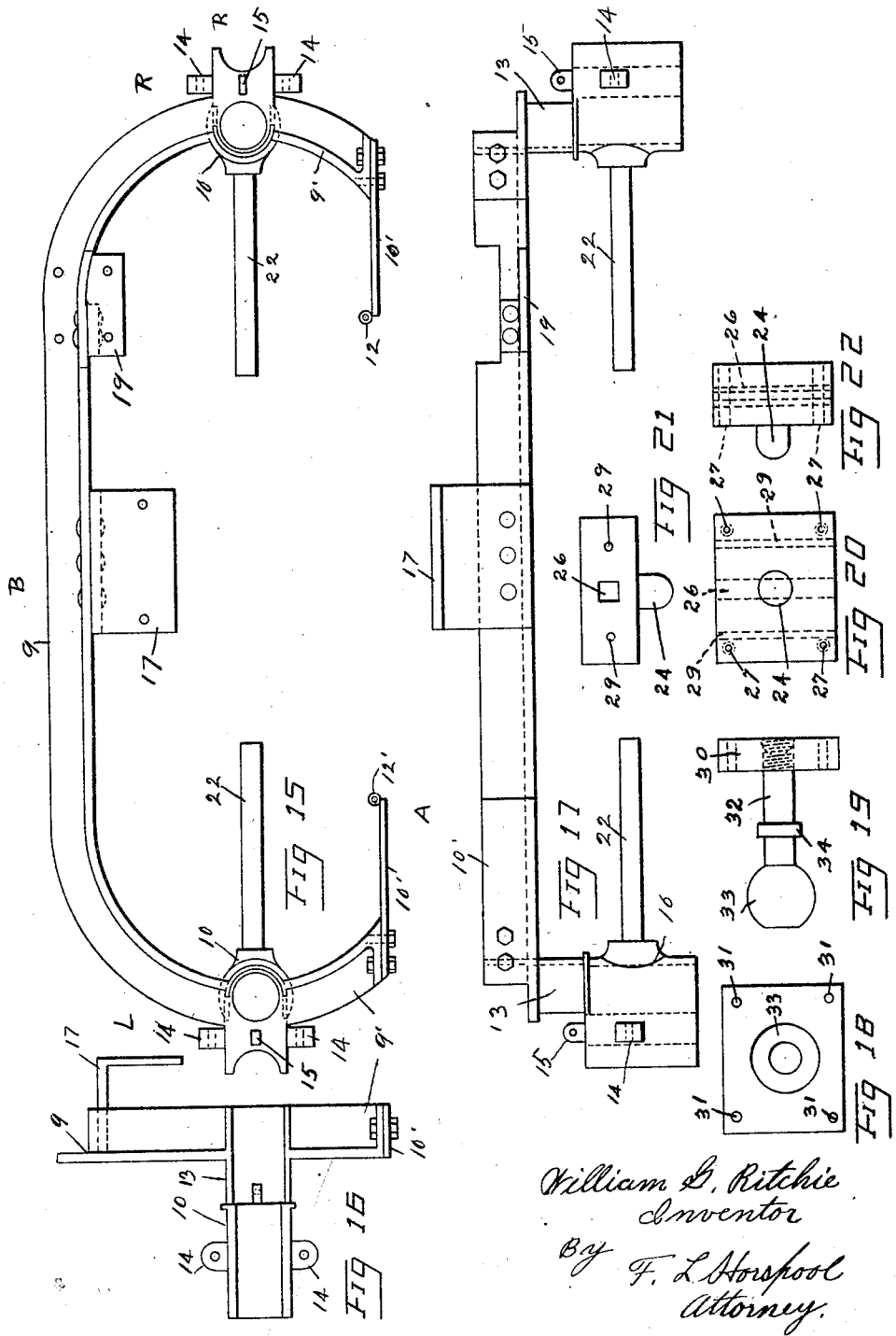

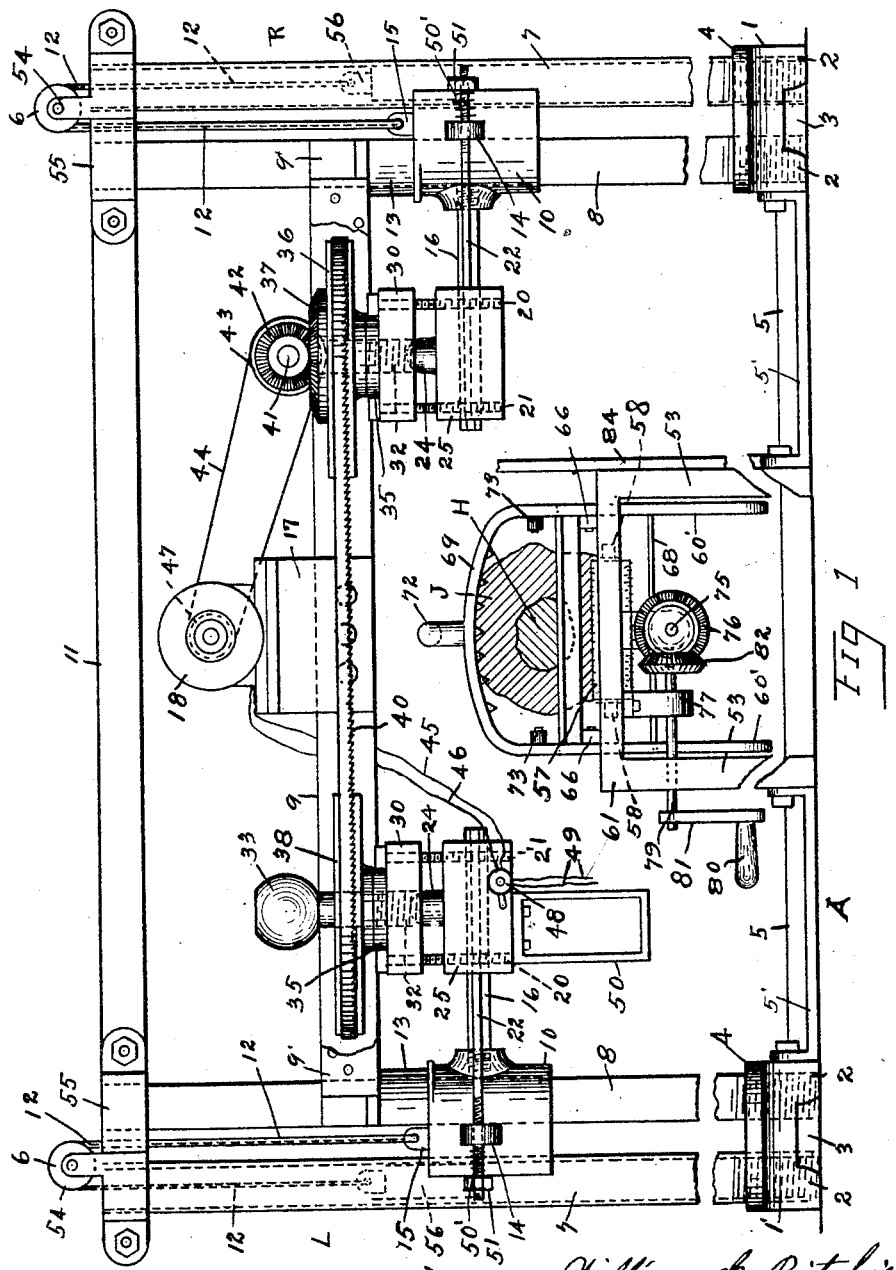

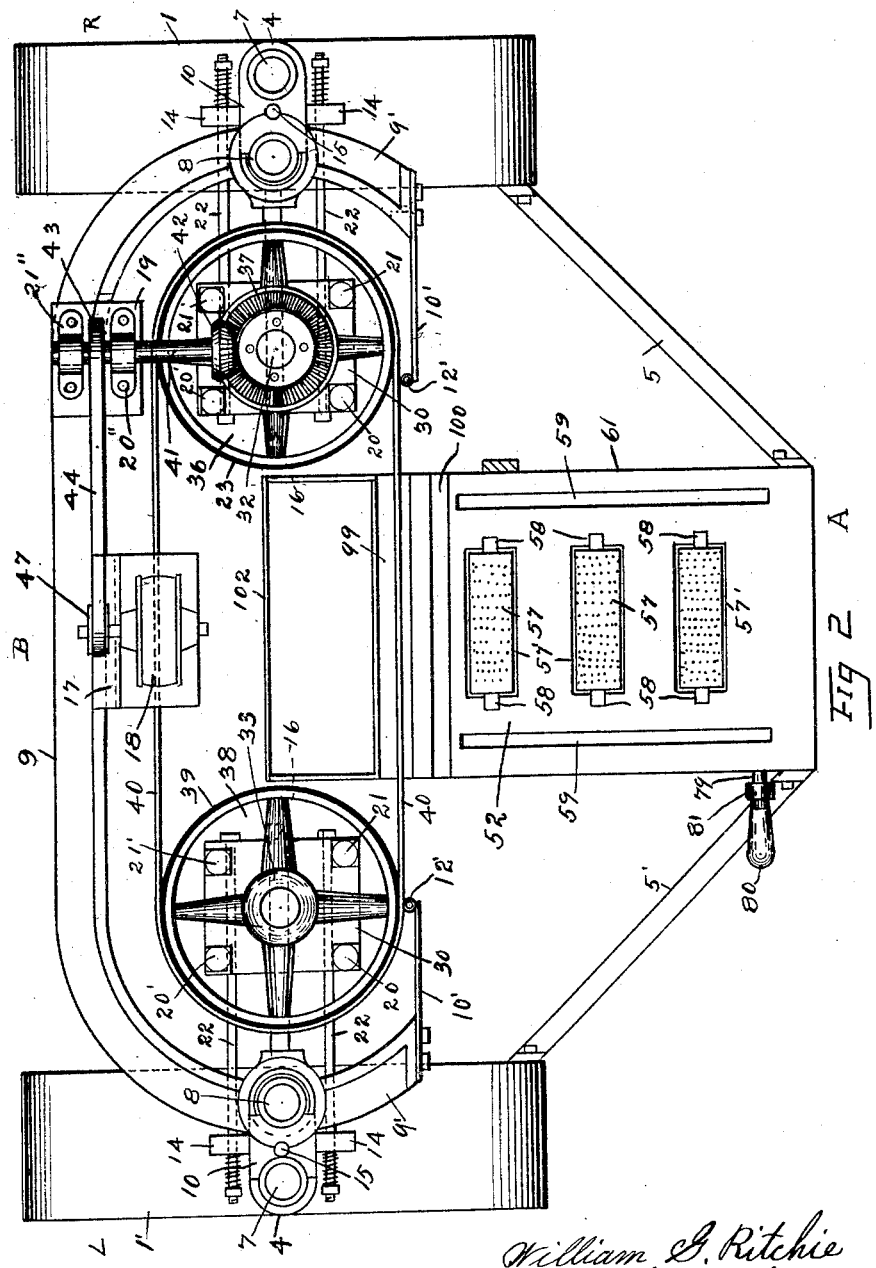

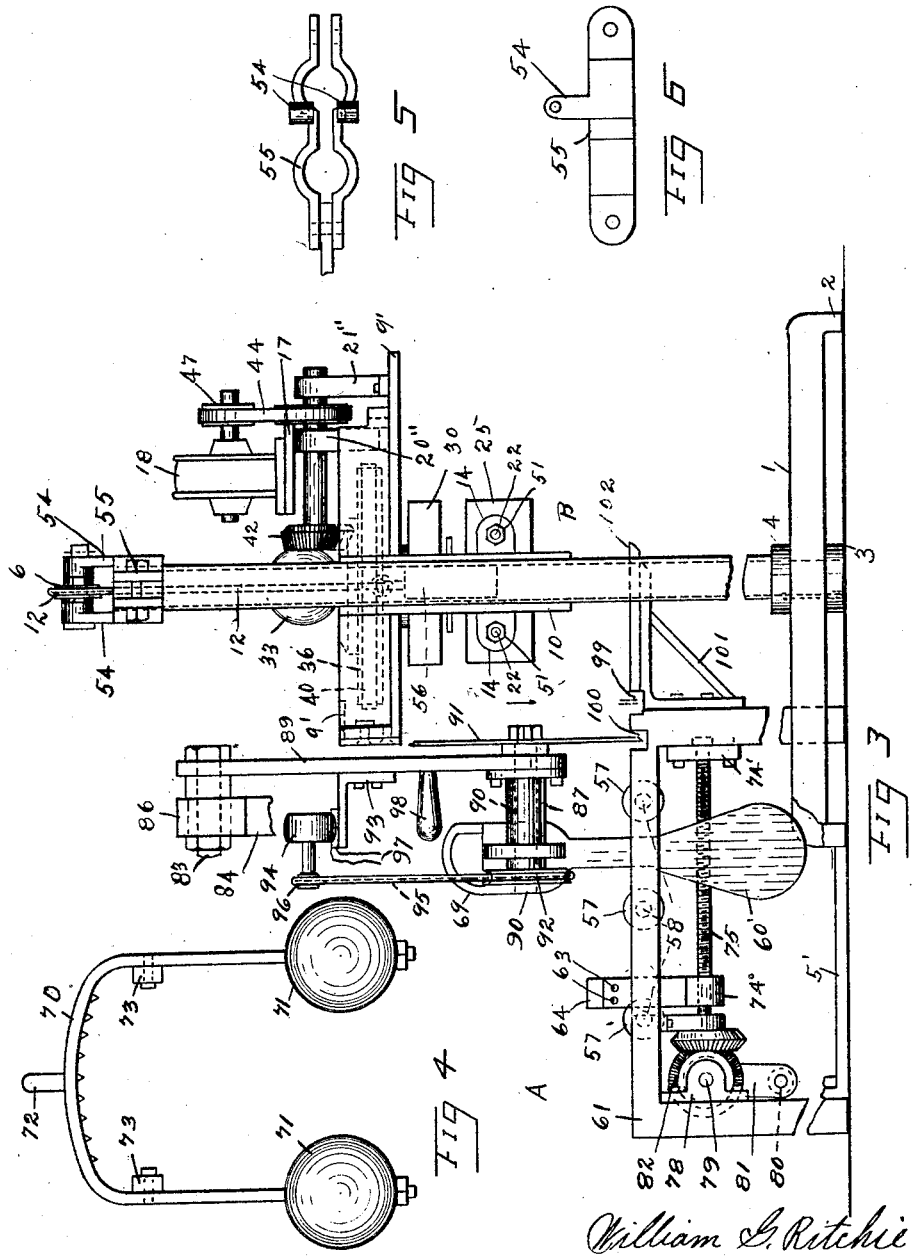

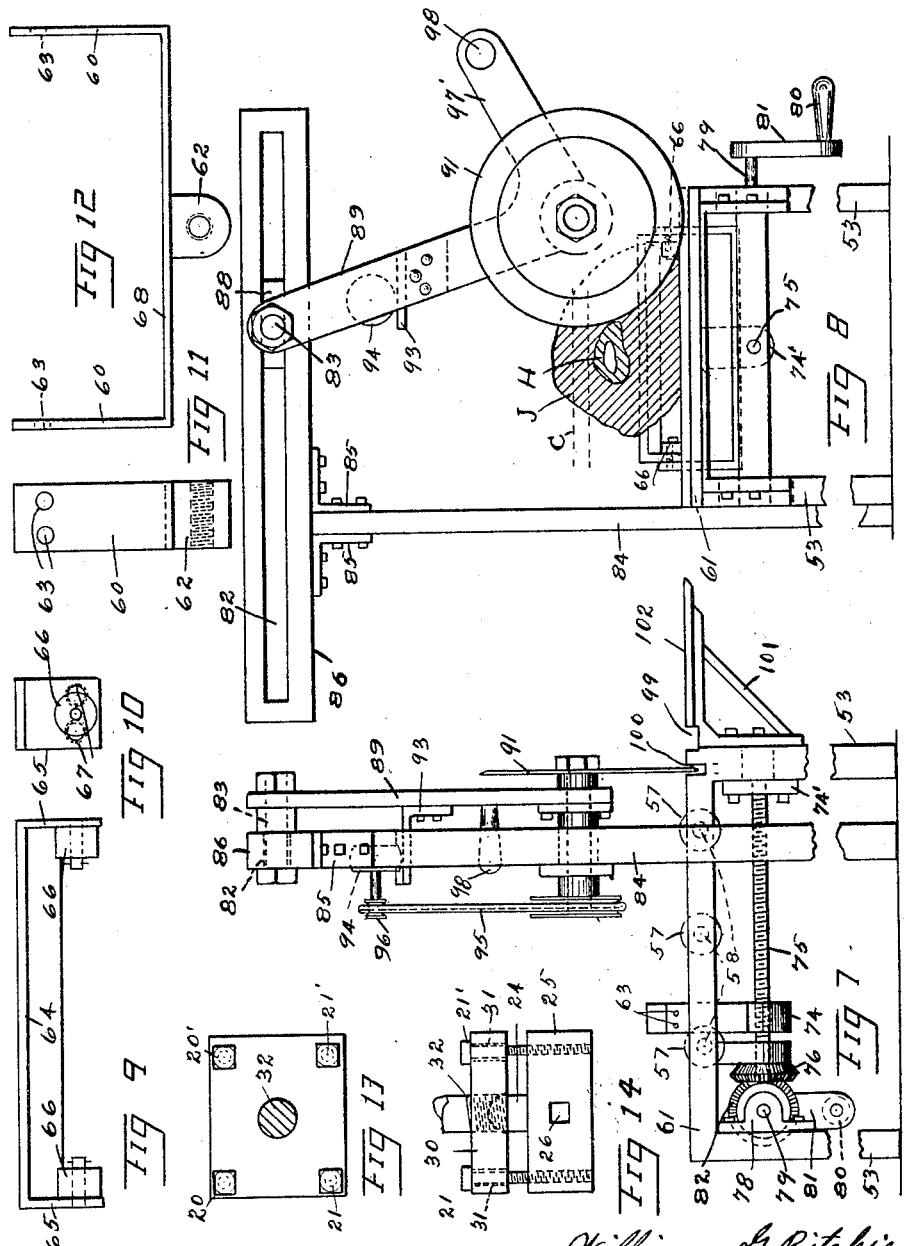

Patented Dec. 27, 1927.

1,653,662

UNITED STATES PATENT OFFICE.

WILLIAM G. RITCHIE, OF SALT LAKE CITY, UTAH.

MEAT-CUTTING MACHINE.

Application filed March 28, 1925. Serial No. 18,936.

This invention relates to a meat cutting machine and more particularly to a machine where a band saw and a revolving disk slicing knife are used in combination for the cutting of the meat.

One of the objects of this invention is to provide a machine of this character for the rapid cutting of fresh or cured meats into strips or slices to the thickness required, by butcher shops or any other place where the meat is to be cut into steaks and the like.

Another object of this invention is to provide a machine of this character whereby a revolving disk knife is used for cutting the meat down to the bone and a band saw is then used to cut through the bone.

With these and other objects in view, which will appear as the nature of the invention is fully described, the same consists of certain novel features of construction as hereinafter fully described and claimed.

In the accompanying drawings forming a part of this specification and in which corresponding parts are denoted by like reference characters, is illustrated the preferred form of the embodiment of the invention capable of carrying the same into practical operation, it being understood that the invention is not necessarily limited thereto, as various changes in the shape, proportions and general assemblage of the parts to be resorted to without departing from the principles of the invention or sacrificing any of the advantages, and the right is therefor reserved for making all the changes and modifications which will fairly fall within the scope of the invention and claims made therefor.

Referring to the drawings, in which:

Figure 1 is a front view of the invention showing the table 61 thereto with its cutting knife and supports therefor removed.

Fig. 2, is a plan view of Fig. 1.

Fig. 3, is an end view of the invention looking from the right hand side showing the table 61 thereto with its cutting knife and supports therefor applied thereon.

Fig. 4, is a front view of a design of meat yoke used in some cases in place of the meat yoke 69 shown on the table 61.

Fig. 5, is a plan view of a coupling.

Fig. 6, is a side view of Fig. 5.

Fig. 7, is a side view of the table 61 looking from the right hand side showing the meat yoke removed, and the cutting knife 91 with the supports therefor mounted thereon.

Fig. 8, is an end view of the table 61 looking toward the cutting knife 91 showing it in a piece of meat as in cutting the same.

Fig. 9, is a side view of the top section of a meat moving bar.

Fig. 10, is an end view of Fig. 9.

Fig. 11, is an end view of the bottom section of the meat moving bar.

Fig. 12, is a side view of Fig. 11.

Fig. 13, is a plan view of Fig. 14.

Fig. 14, is an end view of a pair of bearing blocks.

Fig. 15, is a plan view of the carriage.

Fig. 16, is an end view of Fig. 15.

Fig. 17, is a front view of Fig. 15.

Fig. 18, is a plan view of Fig. 19.

Fig. 19, is a side view of an upper bearing block.

Fig. 20, is a plan view of the lower bearing block.

Fig. 21, is an end view of Fig. 20.

Fig. 22, is a side view of Fig. 20.

The reference character A denotes the front, B the back, R the right hand and L the left hand part of the invention.

My invention comprises a right hand base 1 and a left hand base 1'. Each base has a leg 2 at its corners thereof, a brace 3 in the center of the under face thereof. The upper face thereof has a boss 4 in the center thereof and in parallel relation to the brace 3 said boss has a pair of holes therein, each of said holes has a thread therein.

A hollow upright 7 has a thread on the lower end thereof which is placed in the thread in the outside hole in each base. Another upright 8 having a thread on the lower end thereof which is placed in the thread of the inside hole in each base. The upper end of each pair of uprights being secured together by a coupling 55.

Over each of the uprights 8 is placed a sleeve 10 the upper end thereof has a neck 13 thereon from which is supported a beam 9 which connects the right hand sleeve with the left hand sleeve, thus forming a carriage for supporting a saw 40 and means for operating the same.

The upper ends of the right hand and left hand uprights are connected together by a brace 11 and the bases thereof are secured together by a brace 5.

Projecting from each side of each sleeve 10 and integral therewith is a lug 14 having an eye therein, and projecting from the top of the sleeve 10 and integral therewith is another lug 15 having an eye therein.

Projecting from the inner face of each of said sleeves is a shaft 16 one end thereof has a thread thereon which is placed in a thread in a hole in said sleeve.

Mounted on the beam 9 and secured thereto by rivets is a bracket 17 upon which is placed and secured thereon an electric motor 18. Another bracket 19 is secured to the beam 9 by rivets upon which a bearing 20″ is mounted and secured thereto by bolts. Another bearing 21″ is secured to a flange of said beam in parallel relation to the bearing 20″.

A lug 54 and integral therewith is placed on each section of the coupling 55 has an eye therein in which is journaled a shaft for supporting a pulley 6. Over the pulley 6 is placed a cable 12 one end thereof being secured to the lug 15 on the sleeve 10 and the other end thereof being secured to a lug on the counter-weight 56 sliding within the upright 7 on each base. The weight 56 is a counter-balance for the carriage in the operation thereof.

Placed on each shaft 16 is a pair of bearing blocks. The lower bearing block 25 has a vertical hole 27 in each corner thereof. Each hole has a thread therein. A square hole 26 runs longitudinally therethrough. The hole 26 is placed over the shaft 16. A pair of holes 29 are one on each side of hole 26 and in parallel relation thereto. Through each hole 29 is placed an adjusting rod 22. Projecting from the upper face of the bearing block 25 is a pin 24 the end thereof being convexed. The upper bearing block 30 rests upon the pin 24 and is secured thereon by bolts 20, 20′ 21 and 21′.

The upper bearing block 30 has a vertical hole 31 in each corner thereof in parallel relation to the threaded holes 27 in the lower bearing block. The center of the upper bearing block has a vertical threaded hole therein in which is placed a thread on a bearing pin 32. The lower end of the bearing pin 32 being cocaved in such a manner that it will fit on and move freely over the pin 24 in adjusting and leveling the same.

The bearing pin 32 when used on the right hand bearing has no ball or handle 33 thereon, the projection being cut off above the collar 34.

Placed over the bearing pin 32 and resting upon the upper face of the bearing block 30 is a washer 35 which is removable and can be replaced when worn out.

Placed on the upper face of the right bearing block 30 is a wheel 36 having a gear 37 secured to the upper face thereof.

Placed on the left bearing block 30 is another wheel 38. Each of the wheels revolve on a bearing pin 32 and are secured thereon by a collar 34. The periphery of each wheel is covered with vulcanized rubber 23 resting on a bedding of strong cloth. This gives sufficient adhesion to a saw 40 to insure its action as a belt without slipping.

Journaled in the bearings 20″ and 21″ is a shaft 41 which has a pulley 43 secured thereon which is placed on the shaft between the bearings 20″ and 21″. The other end of the shaft 41 has a gear 42 thereon which meshes in the gear 37 on the wheel 36. A belt 44 is placed over the pulley 43 and over a pulley 47 on the motor 18. Through the belt 44 power is transmitted from the motor 18 to the shaft 41 which in turn transmits power to the wheel 36 to operate the saw 40, which in turn operates the wheel 38.

Wires 45 and 46 connect the motor 18 with a control box 48 located on the left bearing block 25. From the control box 48 runs the main lead wires 49 for supplying the power to the control box which then supplies it to the motor in the usual manner by the movement of the handle thereon.

Secured to the bottom of the left bearing block 25 is a bracket 50 in which a foot of the machine operator is placed in lowering the carriage while the saw is cutting the bone H in the meat J as shown by dotted lines C in Fig. 8.

The adjusting rod 22 after being placed through the holes 29 in the bearing blocks 25, the outer ends thereof passing through the eye in the lugs 14, a spring 50′ is then placed over the outer end of each rod after passing through the lug 14. The spring is then secured thereon by a nut 51. The springs 50′ are placed on each rod to give the required tension on the saw, and in case of any unexpected strain on the saw the springs will give a little, thus preventing the breaking of the saw.

To tighten the tension on the saw the nuts 51 are turned onto the rods 22 and to loosen the tension they are turned in the opposite direction.

The table 61 and the attachments thereto being a part of my invention is constructed in the following manner.

A top 52 is provided for the table having legs 53 thereunder for supporting the same. A plurality of rollers 57 having a journal on each end thereof which is placed within a notch 58 in the table top at the end of each roller. The table top has an opening 27′ therein for each roller to operate therein.

The table top 52 has a longitudinal slot 59 in each side thereof. Through the slots 59 are placed the legs 60 of the bottom section of a meat moving bar 68. Secured to the bottom of the section 68 and integral therewith is a lug 62 having a threaded hole therein. A pair of holes 63 is placed near the upper end of each leg.

To each leg 65 of the upper section 64 is pivotally secured a roller 66 to allow said section to move freely on the table top. In each leg and back of the rollers is placed a pair of threaded holes 67 which are in parallel relation to the holes 63 in the legs of the section 68. Through the holes 63 bolts are placed having a thread thereon which enters the thread in the holes 67 thus securing the two sections together.

Secured to the underside of the table top are bearings 74 and 74' in which a shaft 75 is journaled. The shaft 75 has a thread thereon which enters the thread in the lug 62 of the meat moving bar. One end of the shaft 75 being secured in the bearing 74' and the other end thereof passing through the bearing 74 and has a gear 76 mounted thereon.

Another pair of brackets 77 and 78 are secured under the table top in which is journaled a shaft 79. The outer end of said shaft has a crank handle 80 thereon and the inner end of said shaft has a gear 82 thereon which meshes with the gear 76 for the operation of the shaft 75.

When the crank 81 is operated by the handle 80 the shaft 79 and the gear 82 are operated which in turn operate the gear 76 and the shaft 75. As the shaft 75 is operated it turns in the thread in the lug 62 which moves the lug on the shaft 75 to move the meat moving bar 68 over the table top in the direction desired.

A meat holding yoke 69 is provided for the table. The legs 60' pass through the slots 59. The lower end of each leg has a fan shape weight thereon and integral therewith. On the inner face of the yoke are teeth which in combination with the teeth on the rollers and the weight on the yoke hold the meat firmly on the table while being cut by the knife or saw.

In Fig. 4 is shown another design of yoke 70. Each leg thereof has a ball weight 71 secured to the lower end of each leg and secured thereon by a nut. This yoke is used where an extra heavy weight is required. The weights are placed on each leg after the legs have been placed through the slots 59. On the inner face and near the upper end of the yoke are rollers 73 for the free movement of the yoke on the table by the handle 72 in the hands of the operator in the movement of cleaning the table.

Secured to the right hand side of the table is an upright 84 having on its upper end a pair of brackets 85, upon which is secured a cross arm 86. Said cross arm has a longitudinal slot 82 therein in which is placed and secured therein a sliding block 88. Said sliding block has a bolt 83 passing therethrough upon which is pivotally placed a bell crank lever 89. Said bell crank lever has a hole in its heel. A bearing 87 having a hole therein and a flange thereon is secured to the heel of said lever in parallel relation to the hole in said lever in such a manner that a shaft 90 can pass through said bearing 87 and the hole in said bell crank lever. A disk cutting knife 91 for cutting the meat is secured on one end of said shaft and a pulley 92 is secured on the other end of said shaft. A bracket 93 is secured to the side of said bell crank lever upon which is placed and secured thereto an electric motor 94 having a pulley 96 thereon. A belt 95 connects the pulley 92 with the pulley 96, by this belt power is transmitted from the motor to operate the cutting knife. The electric power for operating the motor is supplied from the control box to the motor by wires 97. Placed at the end of the arm 97' of the bell crank lever is a handle 98 to which the operator holds in the movement of cutting the meat.

Located on the back end of the table 61 is a notch 99 in which the saw enters after cutting through the meat. A little forward of this notch is located a groove 100 in which the knife enters after cutting through the meat.

Secured to the back legs of the table 61 are brackets 101 for supporting a tray 102, said tray to receive the meat as it is cut and falls from the larger piece of meat.

Secured to the front legs of the table 61 by one end is a brace 5' the other end thereof being secured to the bases.

To protect the operator of the machine from being cut by a saw while the machine is in operation, a guard 10' is attached to arms 9' of the carriage by bolts. A saw guard 12' is secured on each outer end of said guards to protect the saw when cutting the bone.

If the saw should be leaning to the front of the machine, loosen the bolts 20 and 21 and tighten the bolts 20' and 21' until the wheel is in a level position. If the saw is leaning backward the bolts 20' and 21' are loosened and the bolts 20 and 21 are tightened. If the band wheel should be tipping to the right the bolts 21 and 21' are loosened and the bolts 20 and 20' are tightened until the wheel is placed in a level position. If the wheel is leaning to the left the adjustment would be opposite to the right.

In the operation of the invention to cut the meat is as follows. After the meat has been secured to the table, move the meat in front of the knife 91 and turn the crank 81 by the operator's hand on the handle 80 in the direction required, thus operating the driving gear 82 which in turn operates the driven gear 76 to operate the shaft 75 thus causing the meat moving bar to move on the thread on the shaft 75 and moving the meat to the position required for the size of cut wanted.

After the meat has been placed into the position for cutting, the handle on the control box 48 is moved a notch on the control box thus allowing the electric current to enter the motor 94 starting it to operate thus starting the knife to revolve to cut the meat.

The operator standing at the left of the table takes a hold of the handle 98 with one of his hands and moves the lever back and forth which moves the knife over the meat, and cutting the meat to the bone. In this movement the block 88 slides back and forth in the slot 82 with the moving of the knife back and forth.

After the meat has been cut to the bone by the knife 91, the knife is removed and the crank 81 is turned to move the cut under the saw and when the meat is so placed the operator places his foot in loop 50 and pushes downward with his leg thus lowering the carriage and saw. The handle of the control box is moved up another notch, thus stopping the current of electricity to the motor 94 and starting the current of electricity to the motor 18 starting it in operation for operating the saw. After the saw has cut through the bone the operator removes his foot from the loop and the weights within the uprights raises the carriage upward and out of the way of the operator so that he may cut another piece of meat.

Having thus described my invention what I claim as new and desire to secure by Letters Patent, is;

1. In a meat and bone cutting machine, the combination of a rotary knife mounted on a movable support, a horizontally disposed band saw having adjustable positions, and a meat supporting table having means thereon for moving the meat relatively to the knife and saw with the movable supported knife below the saw, the knife being adapted to be deflected by a bone and clear the same.

2. In a meat and bone cutting machine, the combination of a frame having a horizontally disposed band saw mounted thereon, said frame mounted to move vertically, a knife mounted on a swinging arm and adapted to be shifted during its cutting operation by the bone, counterweight means for assisting the frame in moving upwards, means for supporting said frame and swinging arm, and means for presenting meat to the knife.

3. In a meat and bone cutting machine the combination of a rotatable knife mounted for free bodily movement and adapted to be controlled in such bodily movement entirely by the work which is to be operated upon, a horizontal placed band saw mounted on a frame, knife and saw operating means, and means movable relatively to the knife and saw for presenting the meat thereto.

4. In a meat and bone cutting machine the combination of a rotatable knife mounted for swinging movement, a horizontally disposed band saw, knife and saw operating means and a meat support having means for presenting the meat to the knife and saw all substantially as set forth.

In witness whereof I, affix my signature.

WILLIAM G. RITCHIE.